United States Patent
Hakel et al.

(10) Patent No.: US 8,458,598 B1
(45) Date of Patent: Jun. 4, 2013

(54) CUSTOMIZED ADVERTISING FOR ONLINE SLIDESHOW

(75) Inventors: Thomas Hakel, Santa Rosa, CA (US); David Andrew Simpson, San Francisco, CA (US); Paul N. Vilevac, Pleasanton, CA (US)

(73) Assignee: Goldmail, Inc., Santa Rosa, CA (US)

( * ) Notice: Subject to any disclaimer, the term of this patent is extended or adjusted under 35 U.S.C. 154(b) by 251 days.

(21) Appl. No.: 12/359,239

(22) Filed: Jan. 23, 2009

Related U.S. Application Data (60) Provisional application No. 61/023,090, filed on Jan. 23, 2008, provisional application No. 61/023,420, filed on Jan. 24, 2008.

(51) Int. Cl.
*G06F 3/00* (2006.01)

(52) U.S. Cl.
USPC ..... 715/749; 715/210; 715/500.1; 705/14.53; 705/14.66; 455/466

(58) Field of Classification Search
USPC .............. 715/4, 730, 731, 733; 705/14; 725/1
See application file for complete search history.

(56) References Cited

U.S. PATENT DOCUMENTS

| | | | | |
|---|---|---|---|---|
| 6,161,127 | A * | 12/2000 | Cezar et al. | 709/203 |
| 2001/0020296 | A1* | 9/2001 | Chafer | 725/1 |
| 2002/0103698 | A1* | 8/2002 | Cantrell | 705/14 |
| 2003/0023973 | A1* | 1/2003 | Monson et al. | 725/34 |
| 2004/0001704 | A1* | 1/2004 | Chan et al. | 386/96 |
| 2005/0278629 | A1* | 12/2005 | Chailleux | 715/704 |
| 2007/0234327 | A1* | 10/2007 | Baxter et al. | 717/151 |
| 2007/0250901 | A1* | 10/2007 | McIntire et al. | 725/146 |
| 2007/0282959 | A1* | 12/2007 | Stern | 709/206 |
| 2008/0010342 | A1* | 1/2008 | Gebhardt et al. | 709/204 |
| 2008/0021775 | A1* | 1/2008 | Lerman et al. | 705/14 |
| 2008/0103884 | A1* | 5/2008 | Blinnikka et al. | 705/14 |
| 2008/0187279 | A1* | 8/2008 | Gilley et al. | 386/52 |
| 2008/0201326 | A1* | 8/2008 | Cotter et al. | 707/5 |
| 2008/0276266 | A1* | 11/2008 | Huchital et al. | 725/32 |
| 2008/0276272 | A1* | 11/2008 | Rajaraman et al. | 725/37 |
| 2008/0288983 | A1* | 11/2008 | Johnson et al. | 725/46 |
| 2009/0006375 | A1* | 1/2009 | Lax et al. | 707/5 |
| 2009/0119169 | A1* | 5/2009 | Chandratillake et al. | 705/14 |
| 2009/0163196 | A1* | 6/2009 | Van Steenbergen | 455/422.1 |

OTHER PUBLICATIONS

Bernard Sklar, Digital Communication Fundamentals and Application, Jan. 11, 2001, http://www.pearsonhighered.com/pearsonhigheredus/educator/product/products_detail.page?isbn=9780130847881&forced_logout=forced_logged_out, 2$^{nd}$ Edition.*

* cited by examiner

*Primary Examiner* — Tuyetlien Tran
*Assistant Examiner* — Abimbola Ayeni
(74) *Attorney, Agent, or Firm* — TIPS Group (57) ABSTRACT

Example embodiments provide apparatuses and methods directed to a system for presenting customized advertisements and branding in conjunction with an audio-visual presentation, e.g., an online slideshow with audio enhancement, played on a player module on an access device. In example embodiments, the online slideshow includes a customized pre-roll advertisement, a customized post-roll advertisement, and/or a customized banner advertisement on the final slide of the slideshow. The system also might customize the GUI views displayed by the player module which plays the online slideshow and/or the player landing page on the CDN that hosts the player module. In example embodiments, the system might base the customization on branding (e.g., in support of "white labeling"), seasonal themes, and/or personalization.

4 Claims, 9 Drawing Sheets

Software Stack for
Access Device With Both Composer and
Player Modules

```
<?xml version="1.0" encoding="UTF-8"?>
<presentation title="Nature_GMR_test1" path="/mail/4928/888/" duration="12296" size="574910" showlink="false" linkurl="" linktext="" respond="false" download="false" version="2.02.2029">
<audio size="73979">gmaudio.mp3</audio>
<cue>
<time>0</time>
<image size="39205" bgcolor="#00000000">gmimage001.jpg</image>
</cue>
<cue>
<time>8953</time>
<image size="142157" bgcolor="#00000000">gmimage002.jpg</image>
</cue>
<cue>
<time>12953</time>
<image size="205472" bgcolor="#00000000">gmimage003.jpg</image>
</cue>
<cue>
<time>18500</time>
<image size="114097" bgcolor="#00000000">gmimage004.jpg</image>
</cue>
</presentation>
```

Fig. 7

```xml
<?xml version="1.0" encoding="UTF-8"?>
<settings xmlns:xsi="http://www.w3.org/2001/XMLSchema-instance" xsi:noNamespaceSchemaLocation="config.xsd">
<!-- MainBuilder -->
<DEFAULT_SCREEN_WIDTH as3_type="number">1024</DEFAULT_SCREEN_WIDTH>
<DEFAULT_SCREEN_HEIGHT as3_type="number">768</DEFAULT_SCREEN_HEIGHT>
<CONTENT_TYPE_SWF as3_type="string">application/x-shockwave-flash</CONTENT_TYPE_SWF>
<TOP_AD_DURATION as3_type="number">3500</TOP_AD_DURATION> <!--Default duration in millisecs -->
<TOP_AD_URL as3_type="string">http://cdn2.goldmail.com/SalesDemos/Demo08/ad0.swf</TOP_AD_URL>
<!-- /MainBuilder -->
<!-- MainController -->
<PRIMARY_CDN_DOMAIN as3_type="string">http://cdn2.goldmail.com</PRIMARY_CDN_DOMAIN>
<SECONDARY_CDN_DOMAIN as3_type="string">http://cdn2.goldmail.com</SECONDARY_CDN_DOMAIN>
<AD_DOMAIN as3_type="string">http://cdn2.goldmail.com</AD_DOMAIN>
<GOLDMAIL_SIGNUP_URL as3_type="string">http://www.goldmail.com</GOLDMAIL_SIGNUP_URL>
<SECS_BEFORE_SHOWING_ETA as3_type="number">5</SECS_BEFORE_SHOWING_ETA> <!-- seconds before showing Estimated Time of Arrival (i.e. load completion) -->
<FULL_BROWSER_FILENAME as3_type="string"></FULL_BROWSER_FILENAME><!--e.g goldmail.htm Blank ("") means use the default page-->
<!-- /MainController -->
<!--SlideShowLoader-->
<BANDWIDTH_VARIANCE as3_type="number">1.06</BANDWIDTH_VARIANCE>
<GMTIMING_FILENAME as3_type="string">gmtiming.xml</GMTIMING_FILENAME>
<!--/SlideShowLoader-->
<!--GMSProxy-->
<PRODUCTION_SERVICE_URL as3_type="string">https://player.goldmail.com/playersupport/service.asmx</PRODUCTION_SERVICE_URL>
<STAGING_SERVICE_URL as3_type="string">http://goldmailstagews.gldmail.com/playersupport/service.asmx</STAGING_SERVICE_URL>
<DEV_SERVICE_URL as3_type="string">http://goldmaildev.goldmailonline.com/PlayerSupport/Service.asmx</DEV_SERVICE_URL>
<DEFAULT_SERVICE_URL as3_type="string">http://player.goldmail.com/playersupport/service.asmx</DEFAULT_SERVICE_URL>
<DEFAULT_ALT_SERVICE_URL as3_type="string">https://player.goldmail.com/playersupport/service.asmx</DEFAULT_ALT_SERVICE_URL>
<GOLDMAIL_NAMESPACE as3_type="string">http://goldmail.com/</GOLDMAIL_NAMESPACE>
<!--/GMSProxy-->
<!--GMSRequest-->
<TIME_OUT as3_type="number">10000</TIME_OUT>
<RETRIES as3_type="number">2</RETRIES>
<!--/GMSRequest-->
</settings>
```

CUSTOMIZED ADVERTISING FOR ONLINE SLIDESHOW

CROSS REFERENCE TO RELATED APPLICATION(S)

This application claims the benefit of U.S. Ser. No. 61/023,090, filed Jan. 23, 2008 and of U.S. Ser. No. 61/023,420, filed Jan. 24, 2008, and U.S. Ser. No. 12/358,231, filed Jan. 22, 2009, all of which are incorporated herein by reference.

BACKGROUND

A "presentation program", as that term is used herein, is a computer software program used to display information in the form of a slideshow. Presentation programs supplement or replace the use of older visual-aid technology, such as pamphlets, handouts, chalkboards, flip charts, posters, overhead transparencies, and slides. When using a presentation program, images, text, movies, and other objects are positioned on individual pages or "slides". (The "slide" allusion is a reference to the slide projector, a device that has been rendered antiquated by presentation software.) Then the slides are printed or displayed on-screen with advancement or other navigation through the slides being controlled by the presenter. It will be appreciated that a slideshow differs from an animation or video in that the slides of the slideshow typically do not create an optical illusion of motion, as do the frames of an animation or movie.

One of the best known presentation programs is Microsoft PowerPoint, which now includes functionality to add narration or music to a slideshow. See e.g., U.S. Pat. No. 6,084,582, incorporated herein by reference. Other presentation programs include OpenOffice.org Impress and Apple's Keynote.

A content delivery network or content distribution network (CDN) is a system of computers networked together across the Internet that cooperate transparently to optimally deliver content (especially large media content) to end users. CDN nodes are deployed in multiple locations, often over multiple backbones. The number of nodes and servers making up a CDN varies, depending on the architecture, with some CDNs reaching thousands of nodes with tens of thousands of servers.

Optimization might have the goal of reducing bandwidth costs or improving end-user performance or both. When optimizing for end-user performance, the CDN might choose to use nodes that are the fewest hops or fewest number of network seconds away from the requestor, so as to optimize delivery across local networks. When optimizing for bandwidth cost, the CDN might choose to use nodes that are less expensive to serve. These two goals tend to align, since servers that are close to the end user often are located within the same network as the end user.

Web analytics is the study of the behavior of website visitors. In a commercial context, web analytics refers to the use of data collected from a web site to determine which aspects of the website work towards the website's business objectives. Data collected usually includes web-traffic reports. It might also include e-mail response rates, direct-mail campaign data, sales and lead information, user-performance data, or other custom metrics. This data is typically compared against key performance indicators and used to improve a website or marketing campaign's audience response.

There are two main technological approaches to collecting web analytics. The first approach, logfile analysis, reads the logfiles in which the web server records its transactions. The second approach, page tagging, uses JavaScript on a web page to notify a third-party server when the page is rendered by a user's web browser or delivered by a web server.

Initially, website statistics consisted primarily of counting the number of client requests (or hits) made to the web server. This was a reasonable method at the time since each website typically consisted of a single HTML file. However, with the introduction of websites that span multiple HTML files, this count became less useful.

Consequently, new units of measure were introduced to gauge more accurately the amount of human activity on web servers. Two of these were page views and visits (or sessions). A page view is defined as a request made to the web server for a page, as opposed to a graphic. A visit is defined as a sequence of requests from a uniquely identified client that ends after a certain amount of inactivity, usually 30 minutes.

The use of web caches presented a problem for logfile analysis. If a person revisits a page, the second request will often be retrieved from the browser's cache and so no request will be received by the web server. Moreover, it became more difficult to identify unique human visitors to a website, due in part to the emergence of search engine spiders and robots. Therefore, log analyzers added functionality to ignore requests from known spiders and robots and to track visits by HTTP cookies.

Typically, the web analytics service manages the process of assigning an HTTP cookie to the user, which can uniquely identify the user during his/her visit and in subsequent visits. HTTP cookies, sometimes known as web cookies or just cookies, are parcels of text sent by a server to a web browser and then sent back unchanged by the browser each time it accesses that server.

Cookies are used by websites for authenticating, tracking, and maintaining specific information about users, such as site preferences or the contents of an electronic shopping cart. Many websites also use cookies for personalization based on a user's preferences.

Cookies are also used to track users across a website. Third-party cookies allow for tracking across multiple sites. Tracking within a site is typically done with the aim of producing usage statistics, while tracking across sites is typically used by advertising companies to produce anonymous user profiles, which are then used to target advertising based on the profiles.

If a browser includes the plugin for Adobe Flash Player, its Local Shared Objects can be used in a way similar to cookies. Indeed, such Local Shared Objects are sometimes called "Flash cookies". Local Shared Objects are an attractive alternative to cookies for web developers because: (a) many users have the Adobe Flash Player installed; (b) the default size limit for a Local Shared Object is relatively large (e.g., 100 kb); and (c) the security controls for Local Shared Objects are distinct from the security controls for cookies, so Local Shared Objects may be enabled when cookies are not.

ECMAScript is a scripting programming language, standardized by Ecma International in the ECMA-262 specification. The language is widely used on the web and is often referred to as JavaScript or JScript, after the two primary dialects of the specification. ActionScript is also a ECMAScript dialect used for the development of websites and software using the Adobe Flash Player platform in the form of SWF (Shockwave Flash) files embedded in web pages. The basic syntax for ActionScript is similar to the C++ programming language.

Progressive download allows users to watch or listen to media as it is being downloaded from a standard web server to their hard drive. This method works best for short-form media where file size is limited. Progressive download ensures highquality playback regardless of the user's Internet connection speed, although a user with a slower connection will wait longer before media starts to play.

In contrast, real-time streaming delivers media in real time over the Internet, from modem to broadband rates. With the open standard Real-Time Transport Protocol/Real-Time Streaming Protocol (RTP/RTSP), no file is ever downloaded to a viewer's hard drive. Media is played, but not stored, by the client software as it is delivered. Real-time streaming is often preferable to progressive download for delivery of long-form video and webcasts of live events.

In a typical incarnation, a banner ad is a rectangular advertisement placed on a website above, below, or on the sides of the website's main content and is linked to the advertiser's own website. In the past, banners ads consisted mostly of text and graphic images, though technologies such as Adobe Flash now allow for the creation of banner ads with text, animated graphics, and sound.

In the context of broadband video commercials, a pre-roll ad is an advertisement that appears before content, where content might include streaming video, animation, or gaming in an interactive environment. A mid-roll ad is an advertisement that appears during the content and a post-roll ad is an advertisement that appears after the content.

A brand is a name, term, design, symbol, or any other feature that identifies one seller's good or service as distinct from those of other sellers. It can apply to a single product, an entire product line, or to an entire company.

The term "white label" identifies a product (or service) where the seller of the product: (a) purchases a fully supported product from another source; (b) applies the seller's own brand and identity to the product; and (c) sells it as the seller's own product. The purchaser assumes the seller is selling its own product.

SUMMARY

Example embodiments provide apparatuses and methods directed to a system for presenting customized advertisements and branding in conjunction with an audio-visual presentation, e.g., an online slideshow with audio enhancement, played on a player module on an access device. In example embodiments, the online slideshow includes a customized pre-roll advertisement, a customized post-roll advertisement, and/or a customized banner advertisement on the final slide of the slideshow.

In certain example embodiments, the system also might customize the GUI views displayed by the player module which plays the online slideshow and/or the player landing page on the CDN that hosts the player module. In example embodiments, the system might base the customization on branding (e.g., in support of "white labeling"), seasonal themes, and/or personalization.

Other embodiments and aspects will become apparent to those of skill in the art upon a study of the specification and drawings.

BRIEF DESCRIPTION OF THE DRAWINGS

FIG. 8 is diagram showing an example configuration file which might be used with example embodiments.

DETAILED DESCRIPTION

The above figures and following embodiments are described and illustrated in conjunction with apparatuses, methods, and systems which are meant to be example and illustrative, not limiting in scope.

Figure 1:
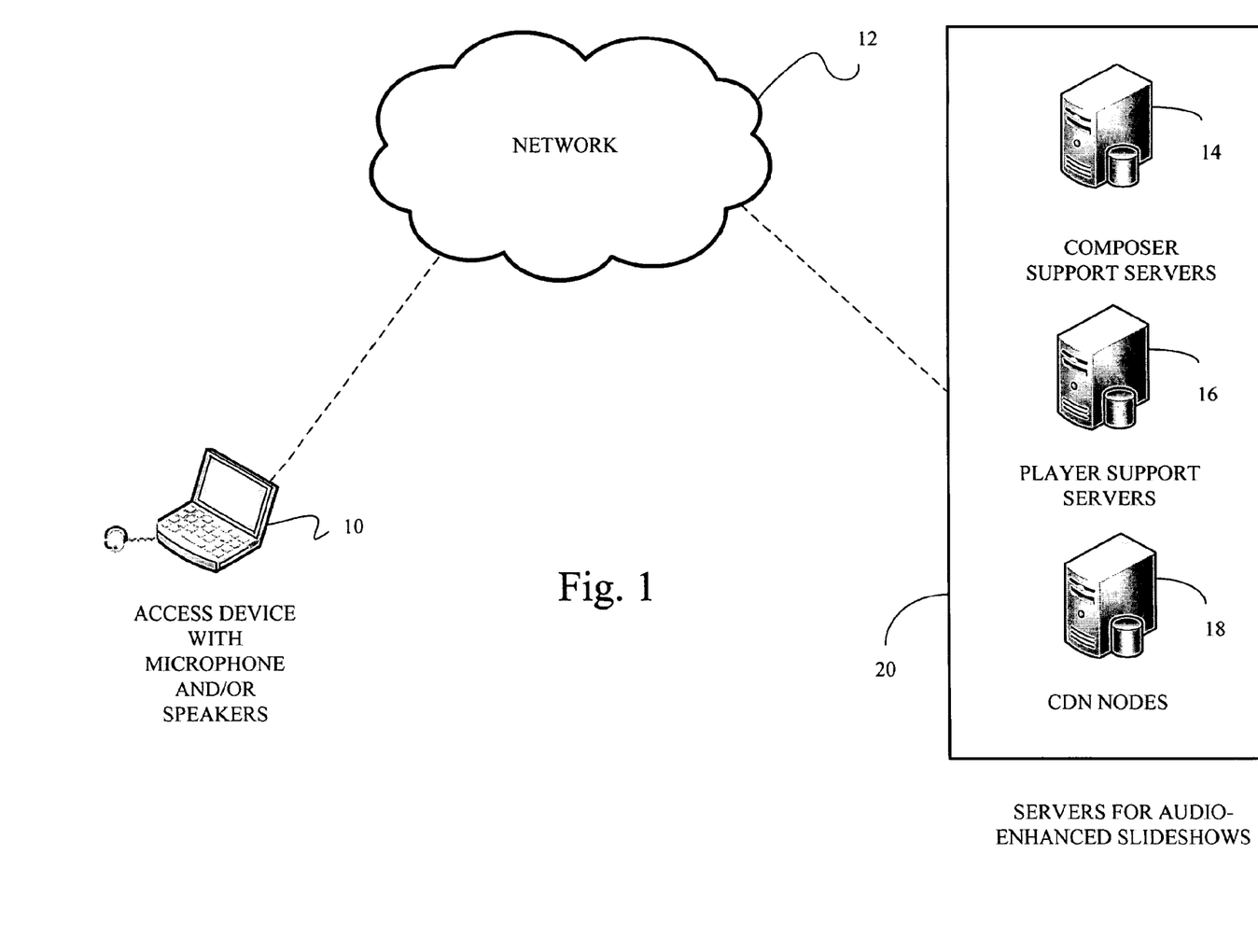
FIG. 1 is a diagram showing a telecommunications network environment in which example embodiments might operate.

FIG. 1 illustrates a telecommunications network environment in which example embodiments might operate. As shown in the figure, an access device 10 is connected to a telecommunications network 12, which in turn is connected to composer support servers 14, and optionally, a player support servers 16 and CDN nodes 18. Below, the composer support servers 14, the player support servers 16, and the CDN nodes 18 are collectively referred to as the system's servers 20. In example embodiments, the access device 10 might be a personal computer, e.g., a laptop computer, with a microphone and speakers (or headphones) as peripherals. In other example embodiments, the access device 10 might be a smartphone or iPhone, a personal digital assistant (PDA), a BlackBerry, a mobile or cellular phone, a portable media player such as an iPod, or any other device with processing functionality capable of connecting to a telecommunications network and uploading or downloading of, for example, a slideshow.

Similarly, in example embodiments, the telecommunications network 12 shown in FIG. 1 might be the Internet or other WAN. In alternative embodiments, the telecommunications network 12 might be a local area network (LAN). Some or all of the connections in the telecommunications network 12 might be packet-switched, wired, or wireless. The servers 20 shown in FIG. 1 might be general purpose or dedicated server computers with server software, e.g., .NET running atop Microsoft Windows 2003 or the LAMP (Linux-Apache-MySQL-PHP and Perl or Python) solution stack, in example embodiments. In other example embodiments, they might be server appliances with server software. Some or all of the servers 20 might be accessed using SMB (Sever Messaging Block) or other application-layer protocols.

Figure 2:
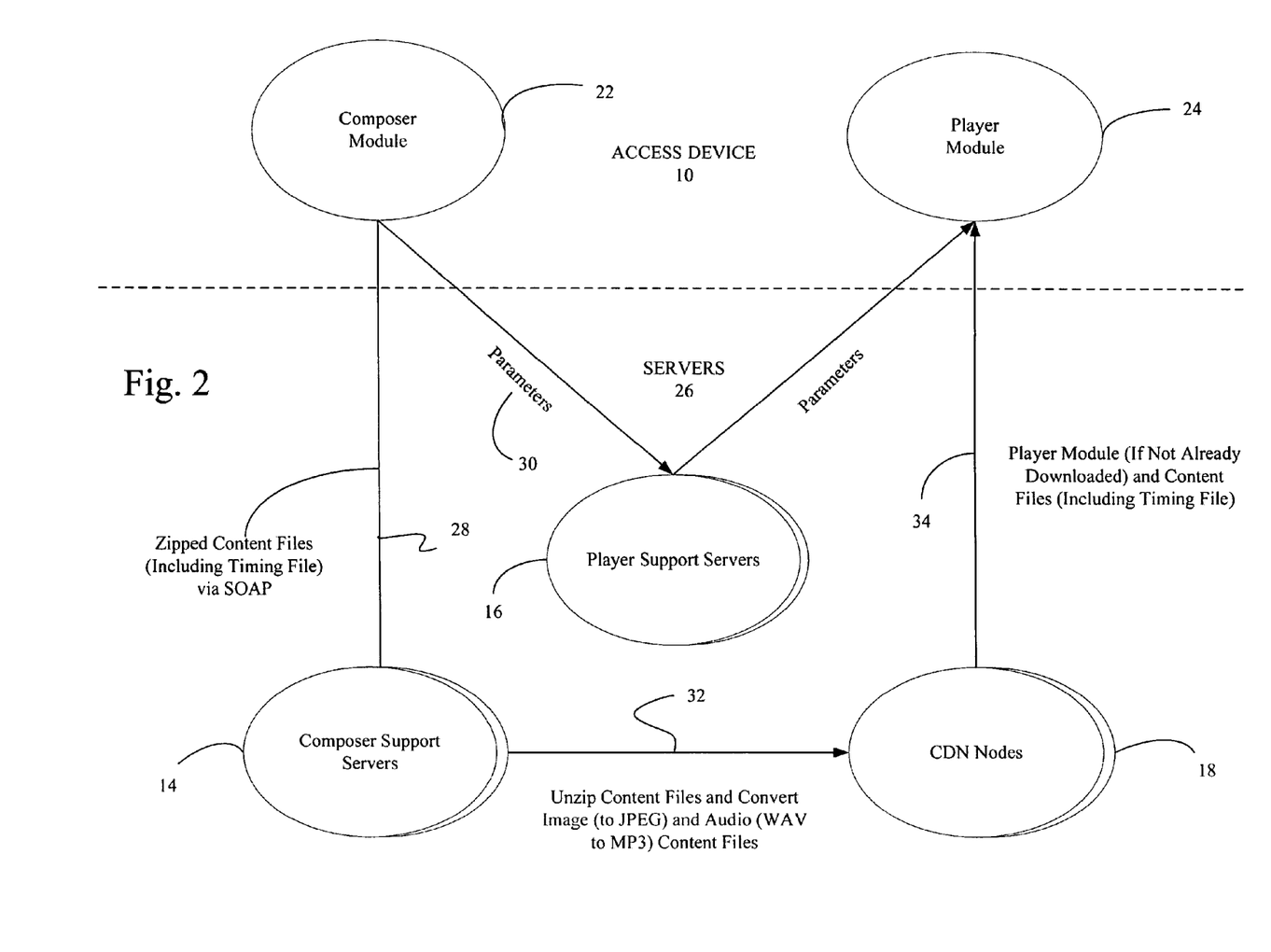
FIG. 2 is a diagram showing a high-level architecture for an audio-enhanced slideshow system which might be used with example embodiments.

FIG. 2 is a diagram showing a high-level architecture for an audio-enhanced slideshow system which might be used with example embodiments. As shown in that figure, an access device 10 might include a composer module 22 and/or a player module 24, where a module comprises software or encoded logic in any form, e.g., a compiled executable, an interpretable script, bytecode, machine instructions, etc. In a typical scenario which will be discussed below, the user uses the GUI for composer module 22 to identify/create the content files which will become an audio-enhanced slideshow. Those content files might include "image files" as the term is broadly used (e.g., JPG, GIF, PNG, BMP, PDF, PPT, and ASCII text) or audio files (e.g., WAV and MP3).). In alternative embodiments, these content files might include animations or video (e.g., MPEG, QuickTime, and AVI). In example embodiments, the composer module 22 creates an additional content file called a "timing file" written in XML or some other suitable language. The timing file relates the image content files to the audio content file using cues (or cue points). In example embodiments, the composer module 22 compresses and archives the content files (e.g., to ZIP) and transmits them using a protocol such as SOAP to the composer support servers 14, as indicated at 28. As will be understood by those skilled in the art, SOAP is a protocol for exchanging XML-based messages over networks, normally using HTTP/HTTPS.

Additionally, as shown in FIG. 2, the composer module 22 transmits parameters 30 to the system's player support servers 16, e.g., using a protocol such as SOAP. Parameters 30 are attributes of an audio-enhanced slideshow that are set by the user who composes the slideshow. Such parameters might include whether the audio-enhanced slideshow is viewable or registered in example embodiments. A "registered" slideshow is available for viewing by a viewer who has provided his/her name to the system; the analogy is to registered mail.

In example embodiments, the composer support servers 14 might unzip the content files and convert the format of the image (e.g., to JPG) and audio (e.g., from WAV to MP3) content files in order to obtain an unpacked, compressed format suitable for playing in a player module 24. These operations are indicated in FIG. 2 at 32. The content files, including the timing file, are then pushed onto the CDN nodes 18.

When a user causes an access device 10 to request an audio-enhanced slideshow as explained in more detail below, the access device 10 might download (e.g., using SOAP) a player module 24 from the CDN nodes 18, as indicated at 34, if not already downloaded. In example embodiments, the player module 24 might: (a) download (e.g., using SOAP) the timing file for the audio-enhanced slideshow from the CDN nodes 18; and (b) initiate the process of downloading (e.g., using SOAP) the slideshow's other content files from the CDN nodes 18. These operations are also depicted at 34 in FIG. 2.

Figure 3:
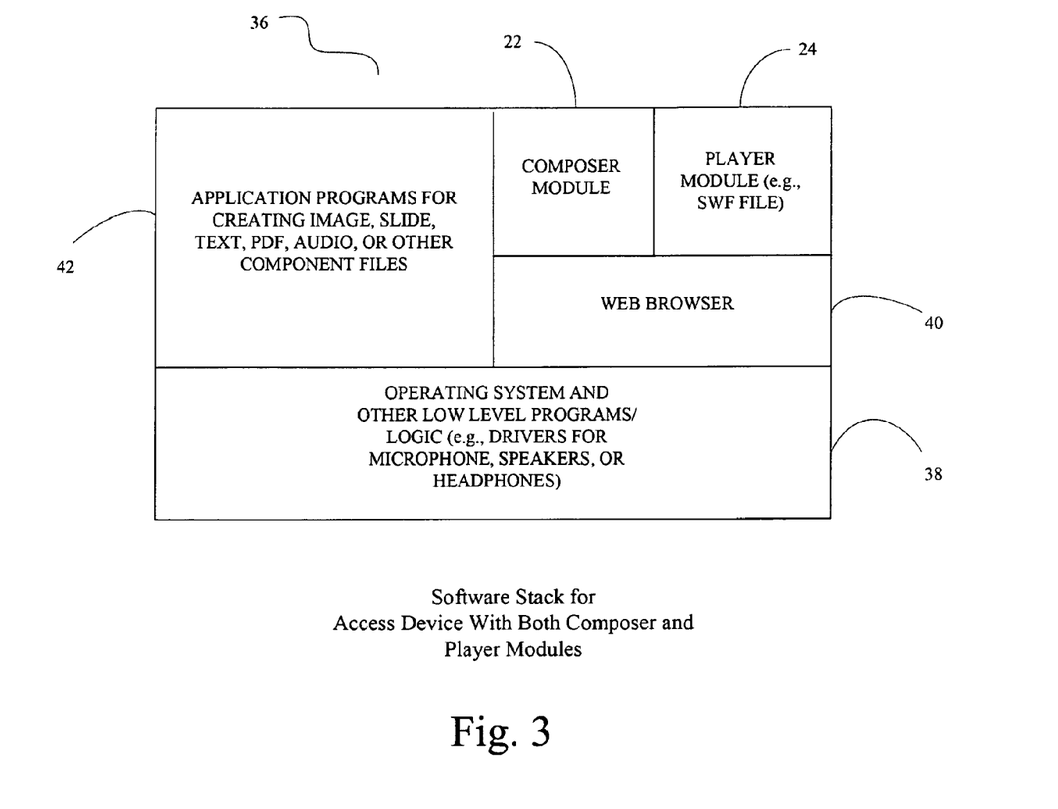
FIG. 3 is a diagram showing a software stack for an access device which might be used with example embodiments.

FIG. 3 is a diagram illustrating a software stack 36 for an access device 10 which might be used with example embodiments. As shown in the figure, an access device 10 might have some operating system functionality (e.g., a kernel) and some drivers (e.g., for a microphone, speakers or headphones), depicted as 38, and a web browser 40. Additionally, an access device 10 might have a composer module 22 and a player module 24, though as indicated above, the composer module 22 is not necessary to play an audio-enhanced slideshow. The composer module 22 might be capable of working in a disconnected or offline mode, in example embodiments. Also, the composer module might make use of a reliable background queue (e.g., one that can recover from most forms of interruption) to upload content onto the composer support servers 14. In example embodiments, the player module 24 might comprise a SWF file with ActionScript which software on the composer support servers 14 create from the content files and which runs on an Adobe Flash Player, a digital media player. In alternative example embodiments, other suitable file formats (e.g., SVG/SMIL) for the player module 24 or digital media players (e.g., QuickTime Player, RealPlayer, Windows Media Player or Adobe Flash Lite for mobile devices) might be used. In other example embodiments, the player module 24 might be an intelligent web-based tool such as an AJAX browser client. Finally in this regard, an access device 10 might have application programs 42 for creating image (including PDF, PPT, and ASCII text) or audio content files which might serve as inputs to the composer module 22.

Figure 4:
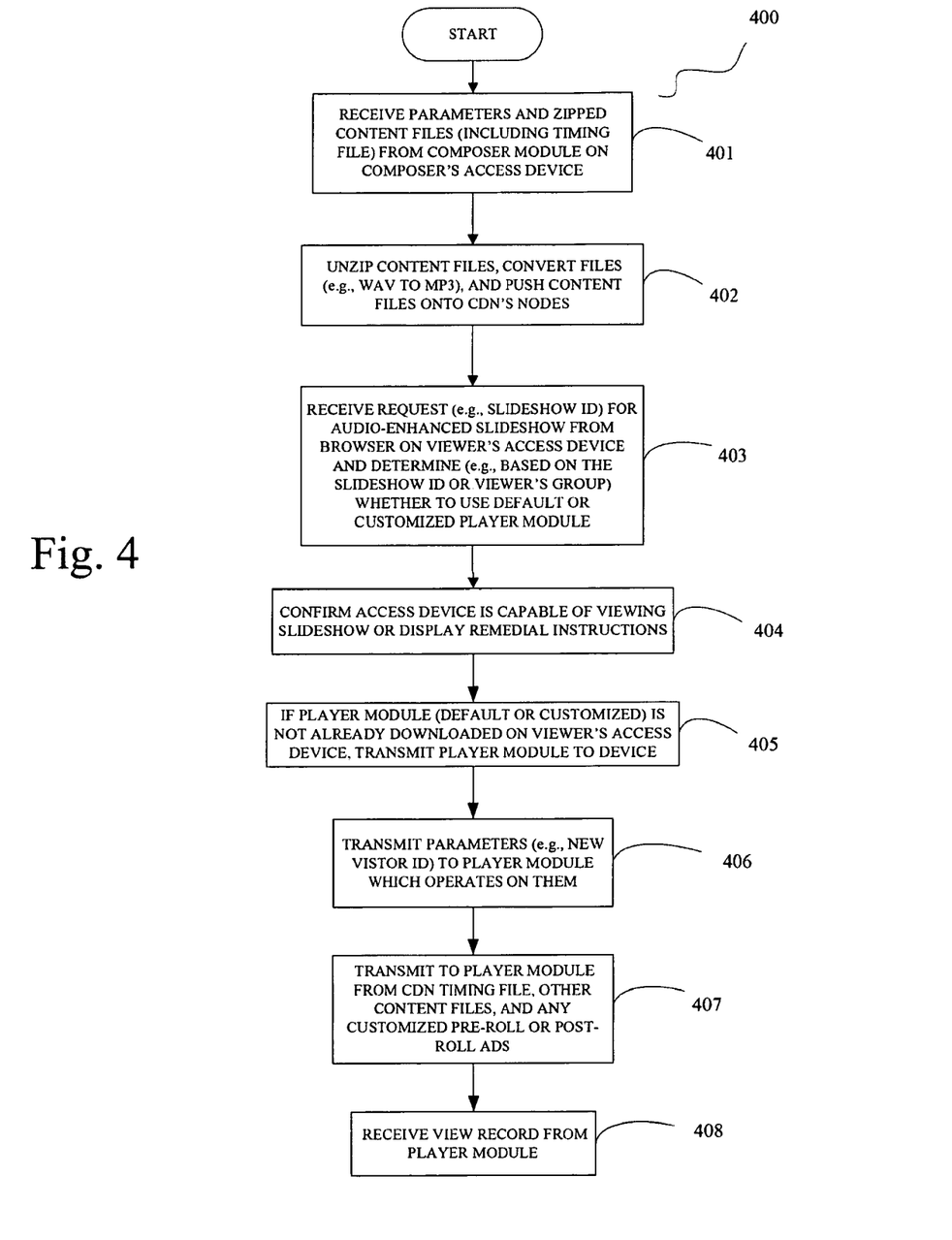
FIG. 4 is a diagram showing a process which the system's servers might use for receiving and transmitting an audio-enhanced slideshow with customized ads on a customized player module, in example embodiments.

FIG. 4 is a diagram showing a process 400 which the system's servers 18 might use for receiving and transmitting an audio-enhanced slideshow with customized ads on a customized player module, in example embodiments. To some extent, FIG. 4 is an elaboration of the flows shown in FIG. 2. In act 401 of the process shown in FIG. 4, the system's servers 20 receive from a composer module 22 on an access device 10: (a) parameters 30 set by the user who composed the slideshow (received by player support servers 16); and (b) zipped content files comprised of a timing file, image files, and an audio file (received by composer support servers 14). In act 402, the composer support servers 14 unzip the content files, convert the image and audio files to an unpacked, compressed, format, and push the content files onto the CDN nodes 18. In act 403, the player support servers 16 receives a request for an audio-enhanced slideshow from a web browser 40 on a viewer's access device 10 and determines whether to use a default or customized player module 24, based on the slideshow ID. In alternative example embodiments, this determination might be based on the viewer's group, e.g., within an organization or on a mailing list. The request might comprise a URL identifying the audio-enhanced slideshow (e.g., in a query string), in example embodiments. The determination as to player module might be based on settings for the viewer, rather than the slideshow ID, in alternative example embodiments. In example embodiments, the default player module 24 might be located in a different folder than the customized player. Also, in example embodiments, the customized player module 24 might include a customized banner ad that is displayed on the final slide of the slideshow.

In act 404, the player support servers 16 confirm that the access device 10 is capable of viewing the slideshow, e.g., that is has speakers for hearing the audio-enhancement. If the access device 10 is not capable of viewing the slideshow, the player support servers 16 might display instructions regarding remedial actions that might be taken, e.g., attaching peripheral speakers. If the access device 10 does not already have a player module 24 (e.g., a SWF file), the player support servers 16 transmits a player module 24 (default or customized) to the access device 10, in act 405.

In act 406, the player support servers 16 transmit (e.g., using SOAP) the composer's parameters 30 to the player module 24, which operates on them. For example, if the user of the viewing access device 10 does not already have a Visitor ID, which is used to track individual access devices which play the audio-enhanced slideshow (e.g., via an HTTP or Flash cookie), the player support servers 16 might include this in the parameters, in example embodiments. Additionally, the player module 24 might display a message informing the viewer that the slideshow is no longer available for viewing, if the composer has set such a parameter. Or the player module 24 might present displays that assist the viewer in submitting their name to the player support servers 16, if the viewer is not registered and the composer has set a parameter requiring registration. Then in act 407, the CDN nodes 18 transmit (e.g., using SOAP) the timing file to the player module 24, which initiates transmission (e.g., using SOAP) of the other content files and any customized pre-roll or post-roll ads residing on the CDN nodes 18. In alternative example embodiments, the system might also transmit (e.g., using SOAP) customized mid-roll ads residing on the CDN nodes 18. Finally, in act 408, the player support servers 16 receive a view record from the player module 24, indicating that the user of the access device 10 has viewed the audio-enhanced slideshow. In alternative example embodiments, the player support servers 16 might receive other web analytics (e.g., a click-through on an advertiser's URL on the final slide of an audio-enhanced slideshow) from the player module 24.

In example embodiments, the pre-roll, mid-roll, post-roll and banner ads might be videos as opposed to image files. Such videos might be fully downloaded, progressively downloaded, or streamed to the player module 24 from the CDN nodes 18. It will be appreciated that a video can be embedded in a SWF file.

Figure 5:
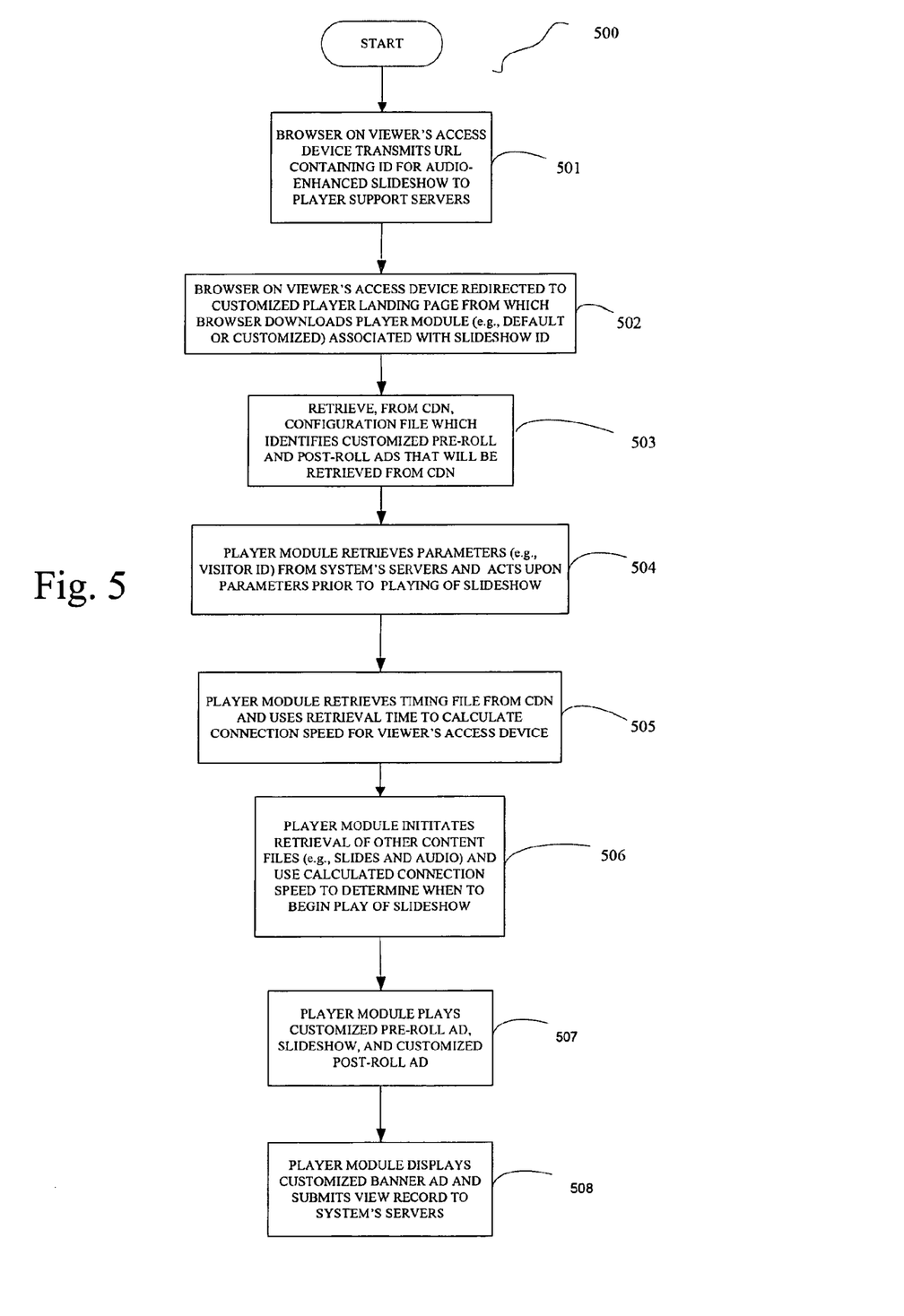
FIG. 5 is a diagram showing a process which an access device might use for playing an audio-enhanced slideshow with customized ads on a customized player module, in example embodiments.

FIG. 5 is a diagram showing a process 500 which an access device 10 might use for playing an audio-enhanced slideshow with customized ads on a customized player module, in example embodiments. In act 501, a web browser 40 on the access device 10 transmits a URL containing an ID for an audio-enhanced slideshow to the player support servers 16. In act 502, the browser 40 on the viewer's access device 10 is then redirected to a player landing page on the CDN nodes 18 from which the browser 40 downloads the default or customized player module 24 (e.g., a SWF file) associated with the slideshow ID, if the player module is not already downloaded onto the access device 10. In act 503, the player module 24 on the access device 10 retrieves from the CDN nodes 18 the configuration file which identifies any customized pre-roll and post-roll ads to be retrieved from the CDN nodes 18, along with the content files. In alternative example embodiments, the configuration file might also identify any customized mid-roll ads to be retrieved from the CDN nodes 18. Then in act 504, the player module 24 retrieves the parameters 30 set by the composer of the audio-enhanced slideshow and acts upon those parameters 30 as described above. In act 505, the player module 24 retrieves the timing file for the audio-enhanced slideshow from the CDN nodes 18 and uses the retrieval time to calculate the connection speed for the viewer's access device 10, in example embodiments. In act 506, the player module 24 initiates retrieval of the other content files from the CDN nodes 18 and uses the calculated connection speed to determine when to begin play of the audio-enhanced slideshow (e.g., how many of the other content files should be buffered before permitting play to begin). In example embodiments, the player module 24 also bases this calculation on: (a) the size of the other content files; and (b) the duration of the audio-enhanced slideshow; and (c) parameters set in the configuration file, e.g., a weighting factor to be applied to the calculated connection speed. In act 507, the player module 24 plays any customized pre-roll ad, followed by the audio-enhanced slideshow (and any customized mid-roll ad), followed by any customized post-roll ad. Finally, once the audio-enhanced slideshow has been played, the player module 24 displays a customized banner ad (which might include a URL for an advertiser) on the final slide of the slideshow and submits a view record (or other web analytic such as a click-through on an advertiser's URL) to the player support servers 16, in act 508.

Figure 6:
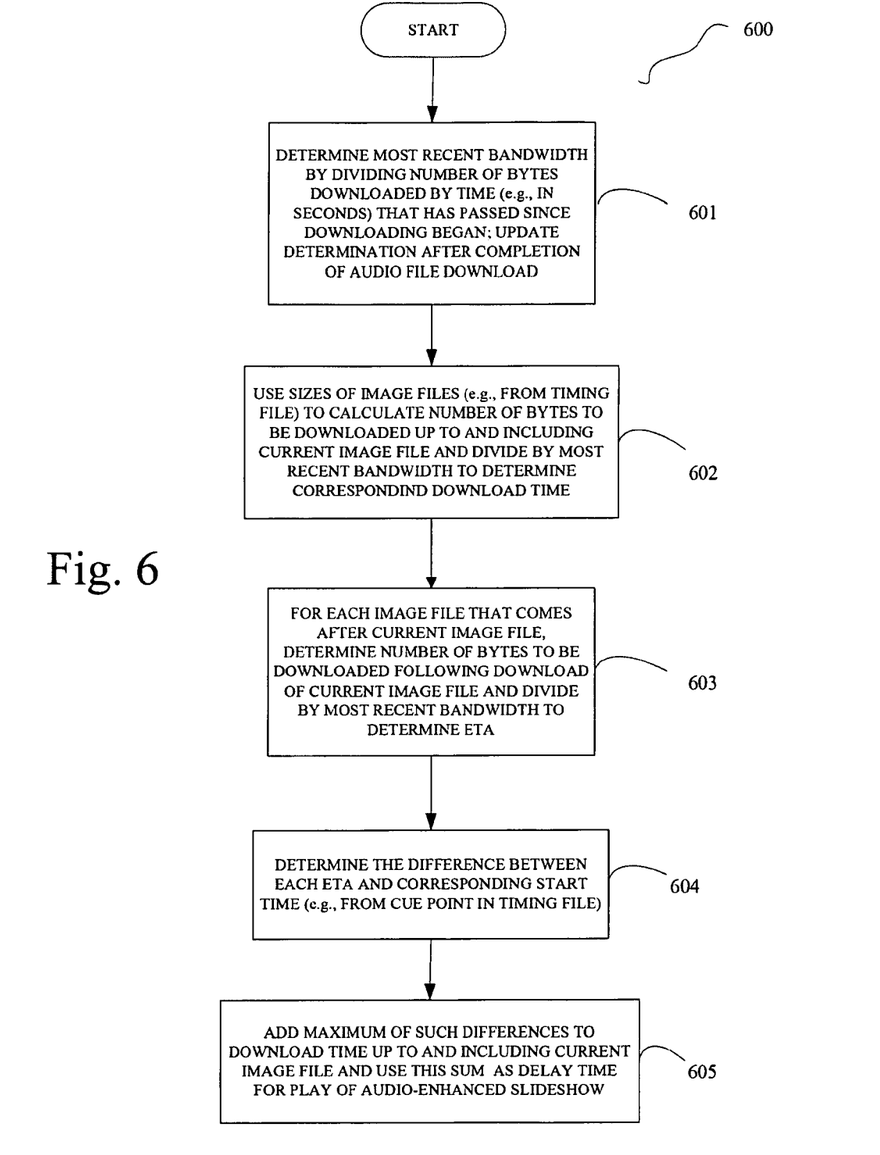
FIG. 6 is a diagram showing an alternative process which a player module on an access device might use to determine when to begin play of an audio-enhanced slideshow, in example embodiments.

FIG. 6 is a diagram showing an alternative process which a player module might use to determine when to begin play of an audio-enhanced slideshow, in example embodiments. It will be appreciated that this process allows for "progressive download", e.g., the process allows media content to be played after some waiting time, while the downloading still continues in the background. It will be recalled that another process for this determination is shown in acts 505 and 506 of FIG. 5. In act 601 of the process shown in FIG. 6, the player module 24 determines the most recent bandwidth for a viewer's access device 10 by dividing the number of bytes that have been downloaded onto the device by the time (e.g., in seconds) that has passed since downloading began. In example embodiments, this determination might be made every second and might be updated after completion of the audio file download to reflect the access device's bandwidth for image files (e.g., slides), as opposed to the bandwidth for both image files and the audio file, the latter being streamable and therefore not downloaded onto a hard drive. Also, in example embodiments, this determination might include a weighting factor, e.g., a bandwidth variance, specified in the configuration file, as noted above. In act 602, the player module 24 uses the sizes of the image files (e.g., from the timing file) to calculate the number of bytes to be downloaded up to and including the current image file and divides that number by the most recent bandwidth to determine a corresponding download time, e.g., the time it would take to download the image files up to and including the current image file. In act 603, the player module 24 iterates over each image file that comes after the current image file and determines for each of those image files the number of bytes to be downloaded following download of the current image file. Then the player module 24 divides that number by the most recent bandwidth to determine an ETA (estimated time of arrival) for each image file that comes after the current image file. In act 604, the player module 24 determines the difference between the ETA and the corresponding start time (e.g., from the cue point in the timing file) for the image file. Finally, in act 605, the player module 24 adds the maximum of these differences (e.g., the maximum of the differences for each image file that comes after the current image file) to the download time determined in step 602 (e.g., the download time up to and including the current image file) and uses this sum as the delay time for play of the audio-enhanced slideshow. In example embodiments, the player module 24 might display this delay time to the viewer in a GUI view. Also, in example embodiments, if the delay time proves insufficient, the player module 24 might pause play of the audio-enhanced slideshow and display a new delay time to the viewer in a GUI view, where the new delay time is based on the current slide as described above.

Figure 7:
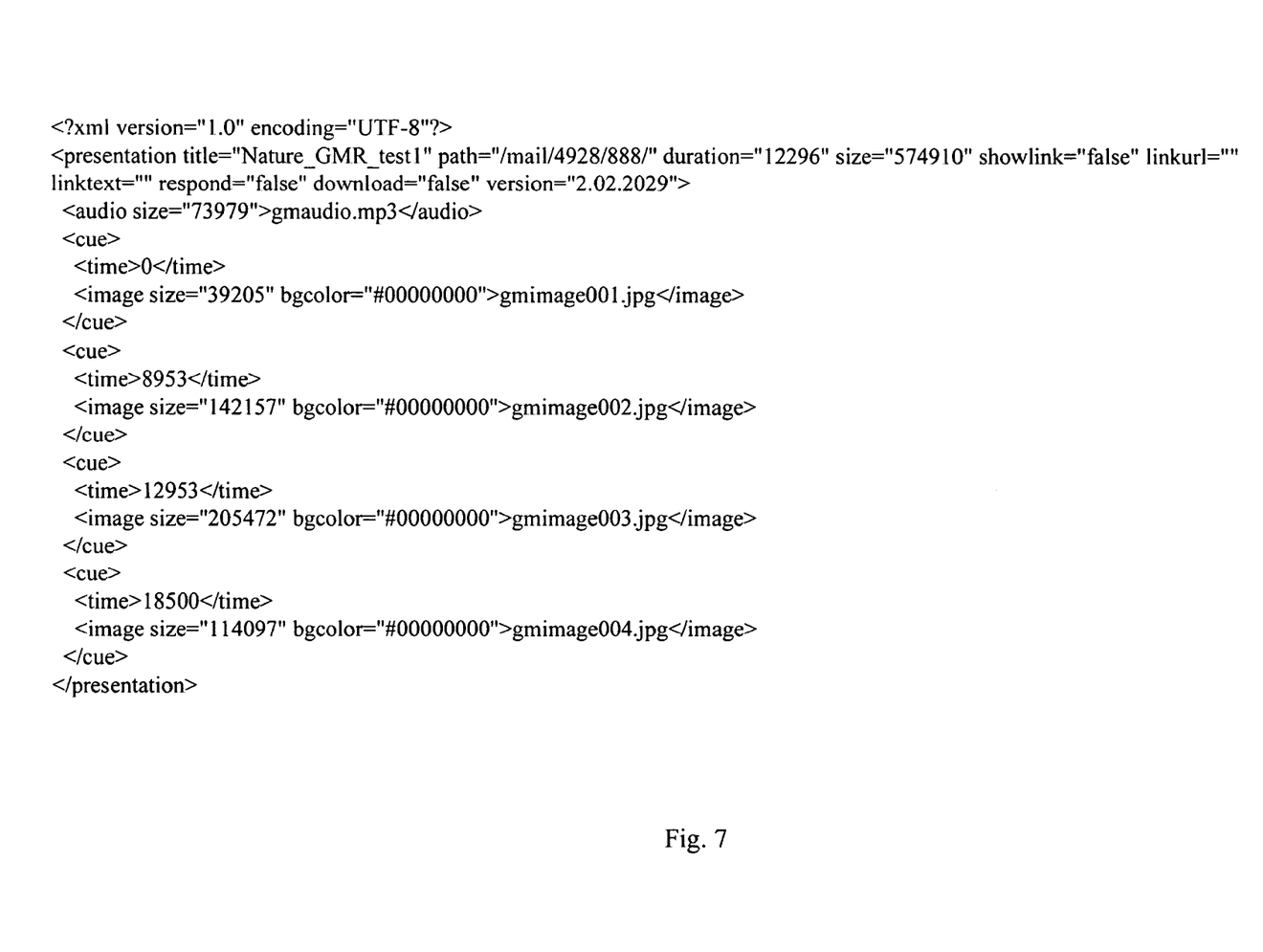
FIG. 7 is a diagram showing an example timing file which might be used in example embodiments.

In example embodiments, the example process shown in FIG. 6 might comprise the following ActionScript in some implementations, where the variable "bw" represents the most recent bandwidth:

```
//calculate time to download to current position.
for (i=0; i<=slideshow.currSlideID; i++)
{
sld=slideshow.slides[i];
bytesToLoad=Math.max(0,(sld.size−sld.loader.content-
    LoaderInfo.bytesLoaded));
//"max" prevents negatives, gmtiming file is sometimes
    inaccurate.
loadTimeToCurr (bytesToLoad/bw)*1000; // add the ETA
    of the slide
}
//For the remaining slides. calculate the max lag between
    when we need to display it and when its loaded.
for (i=slideshow.currSlideID+1; I<slideshow.numSlides;
    i++)
{
sld=slideshow.slides[i];
bytesToLoad=Math.max(0,(sld.size−sld.loader.con-
    tentLoaderInfo.bytesLoaded));  //prevent negatives,
    gmtiming file is sometimes inaccurate.
``` totalLoadTime+=(bytesToLoad/bw)*1000; //add the
   ETA of the slide lag=totalLoadTime−sld.startTime;
   maxLag=Math.max(lag, maxLag);
}
// Delay starting the slide show by this difference so we are safe all images will be ready.
preLoadTime=loadTimeToCurr+maxLag;

FIG. 7 is a diagram showing an example timing file which might be used with example embodiments. As indicated in FIG. 4, the composer module 22 creates a timing file based on the other content files identified by the user composing an audio-enhanced slideshow. The player module 24 then uses the timing file to download the other content files from the CDN nodes 18 and determine when play of the slideshow should begin. The timing file shown in FIG. 7 is written in XML. In this example timing file, the start and end tags "audio" specify a an audio file, gmaudio.mp3, which has a file size of 73979 bytes and which might be used for audio-enhancement of a slideshow. It will be appreciated that MP3 files are streamable. The start and end tags "cue" define cue points in the slideshow, which consist of paired play/display times (relative to a starting time of 0) and image files or slides. For example, the first cue point includes (1) a play/display time specified as 0 between start and end tags "time" and (2) a slide specified as gmimage001.jpg (which has a file size of 39205) between start and end tags "image". Similarly, in this example timing file, the last cue point includes (1) a play/display time of 18500 and (2) a slide specified as gmimage004.jpg (which has a file size of 114097).

FIG. 8 is a diagram showing a configuration file which might be used with example embodiments. As indicated in act 503 of FIG. 5 above, the player module 24 uses the configuration file to identify any (possibly customized) pre-roll, mid-roll, or post-roll ads to be played with the audio-enhanced slideshow. The configuration file shown in FIG. 8 is written in XML. In this example configuration file, the start and end tags TOP_AD_DURATION specify a default duration for a pre-roll ad of 3500 milliseconds and the start and end tags TOP_AD_URL specify the URL (http://cdn2.goldmail.com/SalesDemo/Demo08/ad0.swf) for the pre-roll ad, which in this case is a SWF file (e.g., with Action Script) that might make use of transition effects (e.g., as described in the SMIL 2.0 Transition Effects Module, Jan. 7, 2005.) In alternative example embodiments, the pre-roll ads, mid-roll ads, post-roll ads, and banner ads might be web pages and/or might include image files as the term was broadly used above, audio files (e.g., jingles), animations, or videos. It will be appreciated that a pre-roll ad or a mid-roll ad might play while the content files for an audio-enhanced slideshow are being downloaded from CDN nodes 18. Also as shown in FIG. 8, the start and end tags GMTIMING_FILENAME specify the timing file to be used with the player module 24. And the start and end tags BANDWIDTH_VARIANCE specify a weighting factor for the bandwidth calculation described in act 601 of FIG. 6. Also as shown in FIG. 8, the start and end tags SECS_BEFORE_SHOWING_ETA specify a delay from the start of the ETA calculations described in act 603 of FIG. 6 until display of an estimated time to the viewer, e.g., in a GUI view. In example embodiments, this delay might be used to postpone display of an estimate to the viewer until a time when the estimate's variability has settled down.

Figure 9:
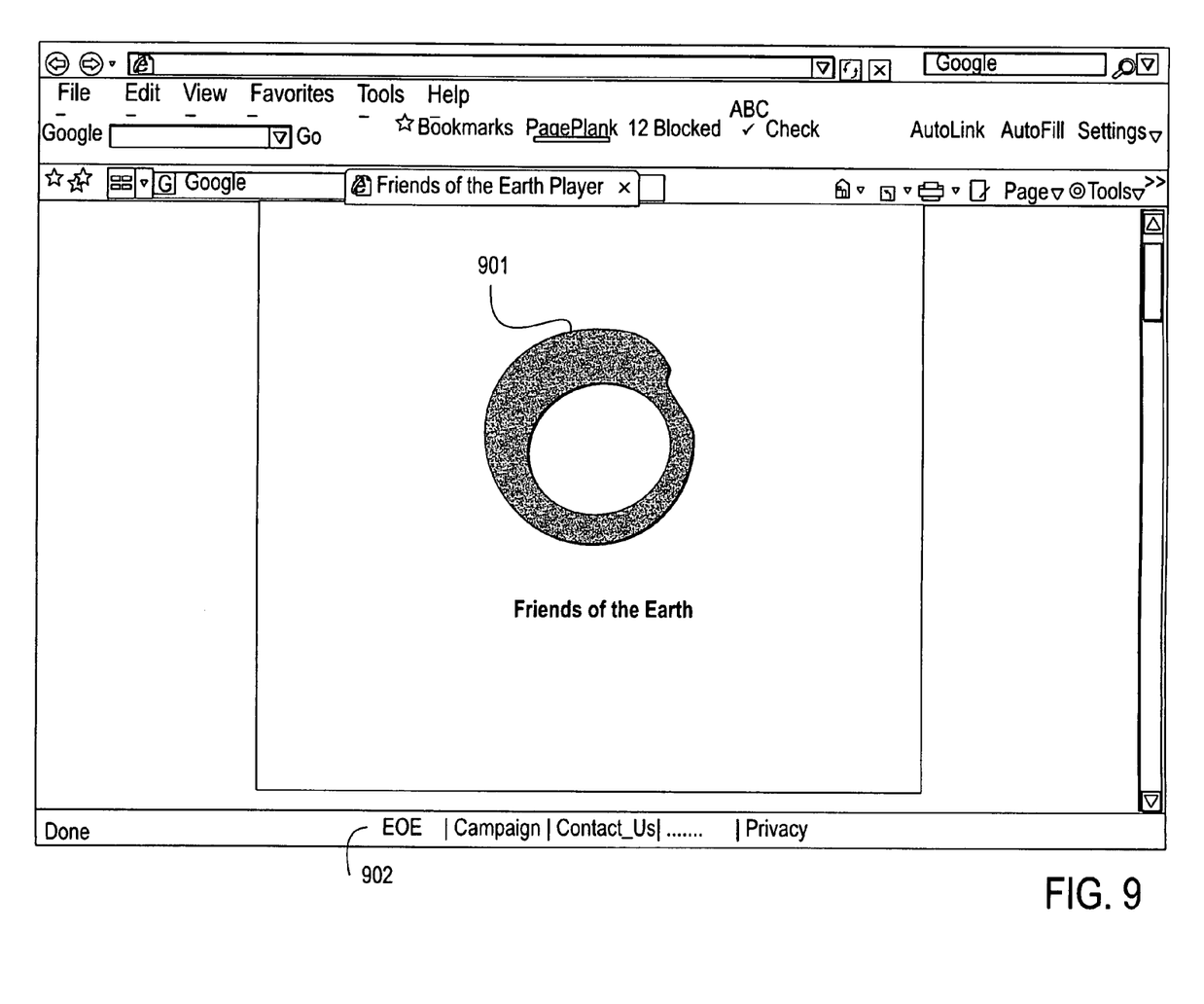
FIG. 9 is an example GUI view showing a pre-roll or post-roll ad in an audio-enhanced slideshow playing on a customized player in a web browser, in example embodiments.

FIG. 9 is an example GUI view showing a customized pre-roll or post-roll ad in an audio-enhanced slideshow playing on a customized player in a web browser, in example embodiments. In this example GUI view, the customization involves branding by a nonprofit organization called "Friends of the Earth", whose logo 901 is displayed prominently in the GUI view. Below the logo 901 is a bottom pane 902 which includes links with captions such as "Campaigns" and "Donate". As indicated above, such an ad might run for a relatively short duration (e.g., 3500 milliseconds) before, during, or after an audio-enhanced slideshow.

In example embodiments, many of the visible elements of the player module 24 and the audio-enhanced slideshow might be customized. Additionally, as noted earlier, the visible elements of the system's player landing page might also be customized. In example embodiments, customizable visible elements might include, but are not limited to the following: (a) the URL that the viewer clicks; (b) the web browser icon; (c) the links on the player landing page; (d) the background color or image on the player landing page; (e) the content including the text and images (and banner ads) on the player landing page; (f) the text and link colors on the player landing page; (g) the pre-roll ad; (h) the mid-roll ad; (i) the post-roll ad; (j) the banner ad in the last slide; (k) the ad's jingle or audio enhancement; and (l) the coloring, positioning, and images within the player module itself.

Example embodiments of the above system might comprise instructions that are stored on a storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and storage servers. The term "processing system" refers to a single processing device or a group of inter-operational processing devices. Some examples of processing devices are integrated circuits and logic circuitry. Those skilled in the art are familiar with instructions, storage media, and processing systems.

While a number of example embodiments have been discussed above, those of skill in the art will recognize certain modifications, permutations, additions, and sub-combinations thereof. For example, software operations performed on the composer support servers 14 might be performed on the player support servers 16 or the CDN nodes 18. Further, the customization might involve personalization rather than advertising, as noted earlier. On the audio-enhanced slideshow might be converted to an audio-enhanced animation of video (e.g., MPEG, QuickTime, AVI, etc.) prior to download by the player module 24, in example embodiments. Indeed, in alternative example embodiments, the audio-enhanced slideshow might include or consist of an audio-enhanced animation or video, as noted above. It is therefore intended that the claims set forth below and those introduced during the prosecution of this application and/or child applications be interpreted to encompass all such modifications, permutations, additions, and sub-combinations as fall within the true spirit and scope of the inventions disclosed herein.

What is claimed is:

1. A method of playing a playable online slideshow, comprising:
   receiving at a server over the Internet a registered online slideshow including an image content file, an audio file, and a timing file developed with a composer module of a personal computer, wherein the timing file relates the image content file to the audio content file using cue points;
   receiving from a computer of a viewer a name of said viewer requesting access to the online slideshow;
   verifying that the name of the viewer matches an authorized name associated with the online slideshow;

downloading said timing file of the online slideshow to the computer of the viewer;

measuring a bandwidth of a network connection of the computer of the viewer;

determining a time to download content to the computer of the viewer based on the bandwidth of the network connection of the computer of the viewer and a size of the online slideshow, wherein the bandwidth of the network connection is determined by dividing a number of bytes downloaded from the server to the computer of the viewer by the time it took to download the number of bytes;

downloading, using progressive download, the image content file and the audio content file comprising audio-enhanced slideshow content to the computer of the viewer including an advertisement;

playing the online slideshow and the advertisement on the computer of the viewer, including playing the first advertisement, the online slideshow played in accordance with the timing file;

recording a list of content played for the viewer; and uploading the list from the computer of the viewer.

2. The method of claim 1, wherein:

the advertisement is a pre-roll advertisement which is played before playing the online slideshow.

3. The method of claim 1, wherein:

the advertisement is a post-roll advertisement which is played after playing the online slideshow.

4. The method of claim 1, wherein:

the advertisement is a mid-roll advertisement that is played during the playing of the online slideshow.

\* \* \* \* \*